United States Patent
Agami (10) Patent No.: US 9,415,523 B2
(45) Date of Patent: Aug. 16, 2016

(54) SYSTEMS AND METHODS OF CONTINUOUS CONVEYOR FEEDING

(71) Applicant: Moshe Agami, Moshav Ram-On (IL)

(72) Inventor: Moshe Agami, Moshav Ram-On (IL)

( * ) Notice: Subject to any disclaimer, the term of this patent is extended or adjusted under 35 U.S.C. 154(b) by 70 days.

(21) Appl. No.: 14/465,413

(22) Filed: Aug. 21, 2014

(65) Prior Publication Data

US 2016/0052728 A1    Feb. 25, 2016

(51) Int. Cl.

| | |
|---|---|
| *B65G 15/58* | (2006.01) |
| *B65G 17/12* | (2006.01) |
| *B65G 43/08* | (2006.01) |
| *B65G 47/34* | (2006.01) |
| *B26D 7/06* | (2006.01) |
| *B65G 47/08* | (2006.01) |
| *B65G 47/82* | (2006.01) |
| *B65G 47/90* | (2006.01) |
| *B65G 47/91* | (2006.01) |
| *B65G 47/92* | (2006.01) |

(52) U.S. Cl.
CPC ............ *B26D 7/0658* (2013.01); *B26D 7/0633* (2013.01); *B65G 47/086* (2013.01); *B65G 47/82* (2013.01); *B65G 47/901* (2013.01); *B65G 47/91* (2013.01); *B65G 47/92* (2013.01)

(58) Field of Classification Search
CPC ........ B65G 15/58; B65G 17/12; B65G 43/08; B65G 47/34
USPC .................. 198/370.01, 418.6, 429, 430, 432; 198/468.6, 575, 803.13, 803.15, 822; 700/223
See application file for complete search history.

(56) References Cited

U.S. PATENT DOCUMENTS

| | | | | |
|---|---|---|---|---|
| 2,941,650 A * | 6/1960 | Clinton | ............ | B65G 47/1492 198/430 |
| 5,381,884 A * | 1/1995 | Spatafora | ............ | B65G 47/918 198/430 |
| 5,435,432 A * | 7/1995 | Tacchi | ............ | B65B 41/02 198/409 |
| 5,628,614 A * | 5/1997 | Pazdernik | ............ | B65G 43/08 198/430 |
| 5,632,080 A * | 5/1997 | Harman | ............ | B23P 19/022 198/468.6 |
| 5,921,375 A * | 7/1999 | van Laar | ............ | B65G 47/848 198/370.12 |
| 6,220,424 B1 * | 4/2001 | Fluck | ............ | B65B 23/12 198/430 |
| 7,104,027 B2 * | 9/2006 | Ford | ............ | B65B 5/106 53/237 |
| 7,416,072 B2 * | 8/2008 | Gosset | ............ | B65G 47/715 198/429 |
| 7,654,386 B2 * | 2/2010 | Dall'omo | ............ | B65B 25/146 198/803.13 |
| 7,726,096 B2 * | 6/2010 | Guttinger | ............ | B65B 5/04 198/867.11 |
| 7,837,024 B2 * | 11/2010 | Flagg | ............ | B65B 5/106 198/429 |
| 8,403,129 B2 * | 3/2013 | Borsarelli | ............ | C03B 9/453 198/723 |
| 8,684,165 B2 * | 4/2014 | Follows | ............ | B65G 21/12 198/426 |
| 8,700,214 B2 * | 4/2014 | Fortman | ............ | B65G 47/53 700/230 |
| 8,770,909 B2 * | 7/2014 | Parker | ............ | B65G 47/32 414/729 |
| 8,776,984 B2 * | 7/2014 | Monti | ............ | B65B 35/38 198/432 |
| 8,973,734 B2 * | 3/2015 | Fujita | ............ | B65G 47/841 198/418.6 |

* cited by examiner

*Primary Examiner* — Douglas Hess

(74) *Attorney, Agent, or Firm* — Mark David Torche; Patwrite LLC

(57) ABSTRACT

An automated system and method for continuously feeding articles onto a moving conveyor belt are described. The automated system includes a plurality of partitions forming the conveyor belt; a controllable drive configured to continuously advance the conveyor belt; at least one gripping element configured to controllably grip and lift the articles, and at least one divider bridge configured to sustain a linear movement of the gripping element along the divider bridge, at a predetermined angle relatively to the conveyor belt.

20 Claims, 9 Drawing Sheets

SYSTEMS AND METHODS OF CONTINUOUS CONVEYOR FEEDING

TECHNICAL FIELD

This present invention relates to a system and method of continuously feeding a conveyor while in motion.

BACKGROUND OF THE INVENTION

As far as herbage crops in general are concerned, the market for all kinds of spices has developed and grown to such extend that the supply is unable to meet the demand in reasonable price, due to the high cost of manual labor needed in sorting harvested crops of various types like chives, green onion etc.

For many years many attempts have been made to minimize the need for manual labor in sorting of various types of vegetables and fruits. To date, there are some mechanized sorters which are practical, effective and efficient pertaining to grain crops, fruits or vegetables, but sorting of herbage crops is still performed by manual labor.

Lately a growing difficulty to market herbage crops has developed due to unavailability of manual labor. For example, the method of sorting chives to date is as follows: Chives arrive from the greenhouse to the packing-house in crates as bundled bunches placed one next to the other. Each bunch contains stalks in different lengths and conditions. Some are too short, curved and yellowish, others are infected, splintered, striped or having burned edges. In order to receive competitive good quality bunches having the required weight, the workers have to perform the following tasks: to cut manually the edges, to shake the bunch in order to get rid of the flawed ones, to sort manually the stalks and remove the damaged ones. (e.g. 100 gr. chives contain about 300 stalks). To weigh manually each bunch, add or lessen stalks in each bunch in order to receive the desired weight, to manually bundle each bunch and pack for delivery.

A highly trained worker is able to provide 15 kg finished and packed stalks bunches daily. The sorted crop weighs 30% of the raw stalks. 70% wastage results from the above described process and the over-weight deriving from manual weighing.

Until recently there were only two ways to feed stalks into compartments vertically to a moving conveyor belt: (1) Starting a work cycle by stopping the moving conveyor belt, hand feeding the products while the moving conveyor belt stands still, and once the compartments on the conveyor belt are loaded, restarting movement. (2) Starting a work cycle while synchronizing the feeding system to speed of the conveyor belt. Once the feeding system is disposed above the compartments on the moving conveyor belt, the products are disconnected from the feeding system into the compartments and the feeding system returns to point 0.

U.S. Pat. No. 4,018,674 to Morris disclosed a system for sorting tobacco leaf. In the system the leaves are carried on a horizontal endless belt conveyor past a sensing station, the method of delivering the leaves from a source to the conveyor comprising the steps of feeding within an enclosed housing vertically disposed above the conveyor a random stream of the leaves so as to fall perpendicularly to the conveyor deflecting the leaves in a plurality of selected paths, each intersecting a major portion of the perpendicularly falling stream within the housing transversely to the direction of movement of the conveyor before reaching the conveyor, each of the selected paths being inclined in a direction obliquely angular to the perpendicular direction of the falling stream, the direction of movement of the conveyor and the plane of the conveyor to cause the leaves within the falling stream to be deflected at different times and move relative to each other sequentially downwardly at angles to the direction of the vertical stream, the conveyor and the direction of movement of the conveyor and depositing the leaves on the conveyor in spaced orientation.

In high throughput, when products are tightly wrapped and in motion, performing cuts is not simple and is quite a technological challenge. The problem is increased, for example, when the stalk to be cut is one out of a tightly wrapped package in high motion, and it is necessary to avoid touching the nearby stalks. The technology exists but it is very expensive, complicated and not practical, when it comes to relatively cheap products, like herbage crops.

SUMMARY OF THE INVENTION

It is an object of the present invention to provide a system and method of feeding a conveyor while in motion and preferably sorting long and thin products including herbage crops, such as harvested crops of various types, like chives, green onion, etc., as well as plastic or light metal sticks, hereinafter collectively referred to as articles.

It is a further object of the present invention to provide a system and method for automated feeding a conveyor while in motion and of sorting of articles and stalks, including inspection for flaws, adjustment of length and weight, bundling and packaging.

Until recently the common way in industry for cutting products is by moving knives toward the object to be cut or moving a plated product toward the knives. The present invention introduces a cheap and practical system and method for shake and cut articles, including stalks to replace the manual shake and cut process. When used for stalks, the system of the invention may load between 50-70 stalks every few seconds from a feeding tray into a conveyor belt partitions.

The system includes a conveyor belt drive and inspection systems, which enables high throughput performance. The feeding system comprises a controllable drive, electronically synchronized with the conveyor belt drive, so that each stalk loaded in each partition may be individually handled.

The stalks in the partitions are preferably further photographed and programmatically analyzed. The analyzed results determine which stalk is emitted, cut or sorted to be automatically bundled and packaged.

According to the present invention an improved system and method of feeding a conveyor while in motion is obtained by synchronized movement of a gripping element relatively to the conveyor belt. The articles are collected from the feeding tray, which is placed next to the conveyor belt, by the gripping element and conveyed in controlled speed and at a predefined angle relatively to the direction of movement of the conveyor belt and then synchronically fed into the proper compartments.

According to the present invention the feeding system moves in predefined angle relatively to the direction of movement of the conveyor belt, whereas the speed vector of the feeding system is synchronized according to the predefined angle to the speed of movement of the conveyor belt. The synchronization of the feeding system ensures the relative linear speed between the articles and conveyor belt substantially equals to zero.

At the end of the feeding cycle the feeding system loses grip of the articles. Once the articles are placed into partitions of the conveyor belt, the feeding system returns to a starting point. Meanwhile, the conveyor belt keeps moving uninterruptedly. The feeding system loads again another bunch of unsorted articles and awaits the synchronism to the next loading cycle.

The synchronization of the feeding system is obtained by controlling the movement of the servomechanism drive of the feeding system and the drive system of the conveyor belt. The software parameters may be determined electronically by an industrial PLC controller or PC computer. In another embodiment of this invention, the feeding system is timed mechanically.

A combined system includes the feeding system and a system of cutting long flexible articles (e.g. herbage crops) is further disclosed. The stalks or any other long and thin product arrive to the packing-house in crates as bunches placed one next to the other on designated feeding try. Each bunch contains stalks in different lengths and conditions which are placed on the feeding trays.

The feeding system loads stalks from a feeding tray and places them into conveyor belt partitions. The collecting of the stalks may be performed by vacuum, magnetic field, physical gripping or any other known means. The feeding system preferably comprises a servomechanism drive electronically synchronized with the drive system of the conveyor belt, so that every 1-3 stalks are placed in each partition the conveyor belt to be potentially individually handled, while the conveyor belt advances continuously.

The conveyor comprises a motorized drive which carries the pulling wheels, e.g. chain or timing wheels. Each cycle the drive causes the advancement of the conveyor, according to the respective gearing ratio with the drive. On the motorized drive which pulls the conveyor an encoder is preferably attached, providing data about the angular position of the wheel.

According to encoder data the speed and location of the conveyor in any given moment is calculable. A controlled servo engine including an encoder preferably drives the feeding system, at a predetermined angle towards conveyor belt, controlling the and speed and timing of movement. The control driver of servo engine receives data constantly from the encoder associated with the conveyor belt. Once the synchronization order is received the engine moves the articles to conveyor belt according to the required gearing factor which equals to $1/\cos \alpha$ of conveyors' speed, where "$\alpha$" is the angle between the conveyor to the feeding system's direction.

When reaching the feeding finish line, the feeding system drops the products and returns to the initial position, ready for the next cycle.

While the articles are in partitions being transferred they are photographed and programmatically analyzed. The analyzed results determine which stalk is to be emitted, cut or sorted as well as automatically bundled and packaged.

According to above results, the stalks are then channeled to different compartments. Those who are to be cut are conveyed to the cutting apparatus. All above tasks are performed without stopping the movement of the conveyor.

When the loaded compartments reach the cutting apparatus, the stalks are forced towards sharp knives by an air pressure system. The flexible stalk bends towards the knives due to the synchronized air pulses on it. The quick encounter with the sharp knives makes the cut at the meeting point and the remained flexible product straightens in its compartment as shown and advances to the bundling and packaging area.

BRIEF DESCRIPTION OF THE DRAWINGS

The present invention will be understood and appreciated more comprehensively from the following detailed description taken in conjunction with the appended drawings in which:

FIG. 2A is an isometric view of an embodiment of a diagonal feeding system;

FIG. 2B is view of conveyor belt partitions fed with;

While the invention is susceptible to various modifications and alternative forms, specific embodiments thereof have been shown merely by way of example in the drawings. The drawings are not necessarily complete and components are not essentially to scale; emphasis instead being placed upon clearly illustrating the principles underlying the present invention.

DETAILED DESCRIPTION OF THE INVENTION

Illustrative embodiments of the invention are described below. In the interest of clarity, not all features of actual implementation are described in this specification. It will of course be appreciated that in the development of any such actual embodiment, numerous implementation-specific decisions must be made to achieve the developers' specific goals, such as compliance with technology- or business-related constraints, which may vary from one implementation to another. Moreover, it will be appreciated that the effort of such a development might be complex and time-consuming, but would nevertheless be a routine undertaking for those of ordinary skill in the art having the benefit of this disclosure.

Reference is now made to FIG. 1A to 1E, showing a combined system comprising automated feeding system 106 and a cutting system 109 for long flexible articles 102 (e.g. stalks). Articles 102 arrive as bunches and are placed on designated feeding try 100. Each bunch contains articles 102 in different lengths and conditions. Once the articles 102 are placed on the feeding tray 100, automated feeding system 106 is configured to feed articles 102 into conveyor belt partitions 101.

Figures 1A, 1B, 1C, 1D, 1E:
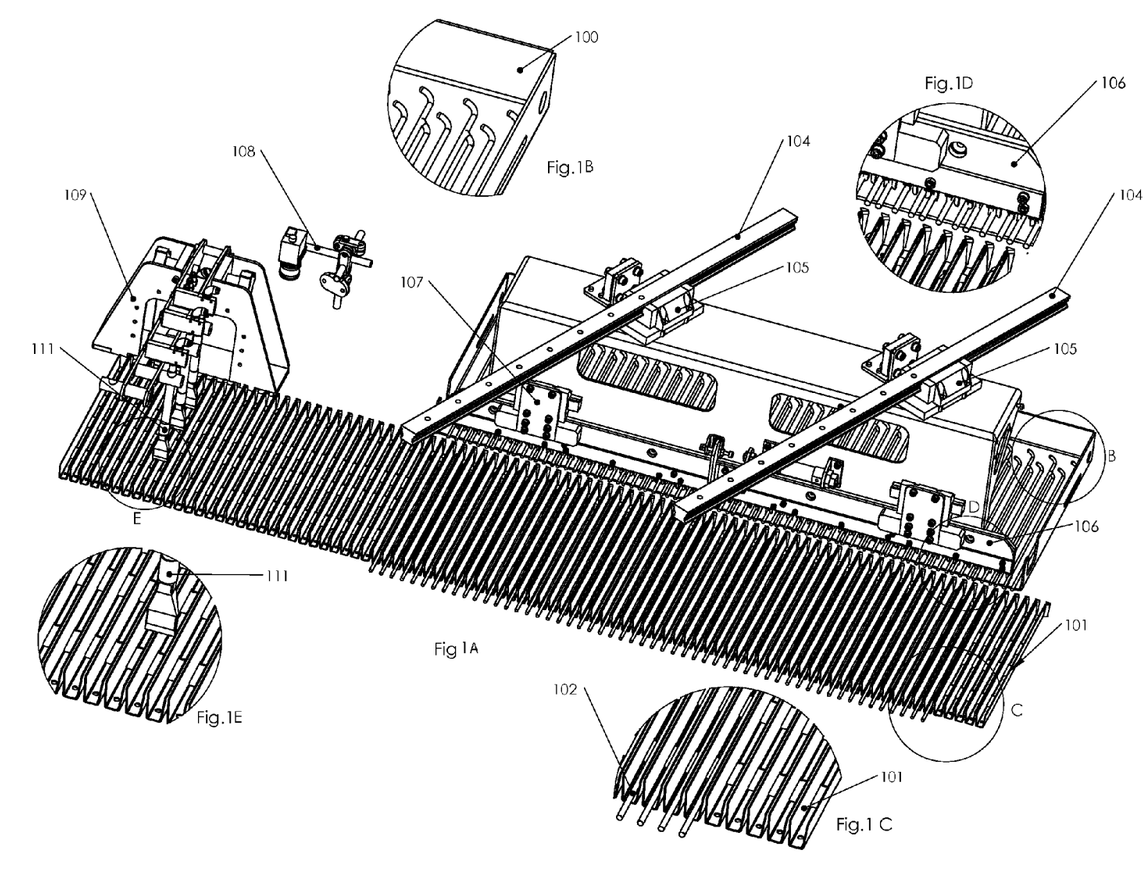
FIG. 1A is an isometric view of an embodiment of the combined system.
FIG. 1B is an enlarged view of the articles shown in FIG. 1A.
FIG. 1C is an enlarged isometric view of the compartments of the conveyor belt.
FIG. 1D is an enlarged isometric view of the feeding system shown in FIG. 1A.
FIG. 1E is an isometric of the cutting system shown in FIG. 1A.
Figures 2A, 2B:
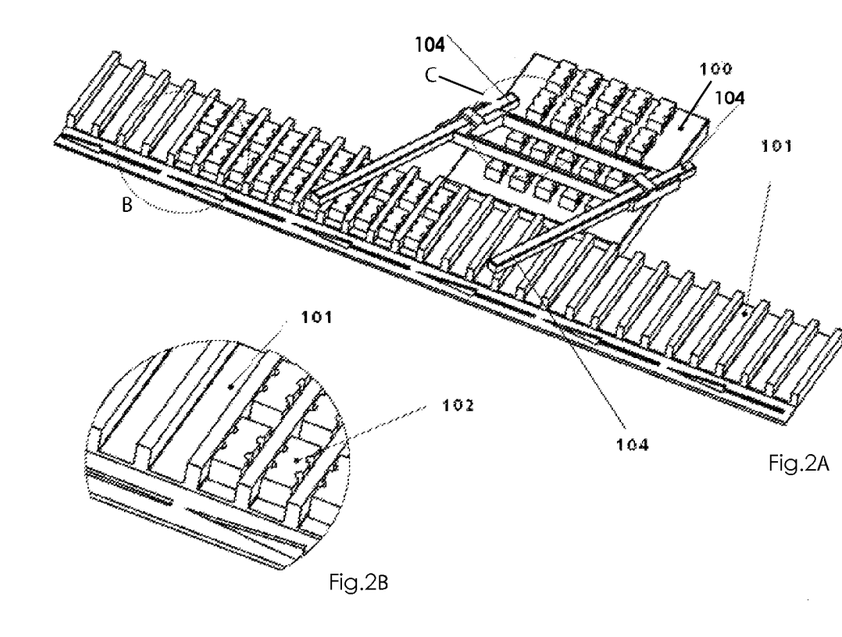
Figure 2C:
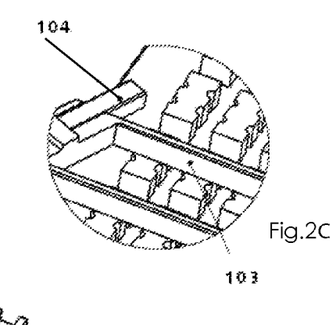
FIG. 2C an enlarged is view of articles in the feeding tray.

The feeding system 106 comprises feeding tray 100, conveyor belt partitions 101 into which the articles 102 are fed, divider bridges 104 which define the direction of the movement of articles 102 towards the conveyor belt. Gripping element 103, shown in FIG. 2A-C, is configured to grip the articles 102, for instance by vacuum, magnetic field, physical gripping or any other suitable means, so as to feed them into conveyor belt partitions 101. Mounting elements 105 define the direction towards and/of angle between divider bridges 104 conveyor.

The conveyor belt comprises a plurality of belt partitions 101, a motorized drive (not shown). Each cycle the drive causes sledding predetermined advancement of the conveyor belt, according to the respective gearing ratio.

An encoder is preferably attached to the drive which pulls the conveyor, providing data about the angular position of the drive. According to encoders' resolution, it is possible to calculate the exact speed and location of the conveyor in any given moment.

A controlled motor (typically servo including an encoder) operates the feeding system 106, moving gripping element 103 forward and backward at a predetermined angle, controlling the speed and location of the movement. The controlled receives data constantly from the encoder of the conveyors belt drive. The driver of synchronizes the movement of gripping element 103 with the movement of the conveyors belt. Once the synchronization order is achieved gripping element 103 moves respectively to conveyors' encoder, according to a preset gearing factor, wherein the speed of gripping element 103 along the conveyor belt equals to the speed of gripping element 103 along divider bridges 104 multiplied by COS α, where "α" is the angle between the conveyor belt and of feeding system 106 and COS represents Cosine function.

Reference is now made to FIG. 3A to 3D, showing a consequence of steps in the process of feeding articles 102 into conveyor belt partitions 101 by feeding system 106. Initially, feeding tray 100 is raised towards gripping element 103. Thereafter articles 102 are gripped by gripping element 103 so as to be suspended from gripping element 103. At the next stage, articles 102 are lifted from feeding tray 100 and driven by system 106, on divider bridges 104 towards conveyor belt partitions 101. Subsequently, system 106 facilitates advancements of articles 102 suspended from gripping element 103 in the direction of divider bridges 104 towards moving conveyor belt partitions 101. Gripping element 103 loaded with articles 102 moves in synchronization with conveyor belt partitions 101, at a speed of the gripping element 103 along divider bridges 104 is determined according to the equation:

$$V1 = V2/\cos \alpha \qquad \text{(Equation 1)},$$

wherein V1 is the speed of gripping element 103 relative to divider bridges 104, α is an angle between divider bridges 104 and conveyor belt, whereas V2 is conveyor belt speed, resulting in a relative linear speed of about zero between articles 102 and conveyor belt, in the direction of advancement of the conveyor belt. The gripping of articles 102 can be performed by vacuum, magnetic field, physical gripping or any other known means.

Figure 3A:
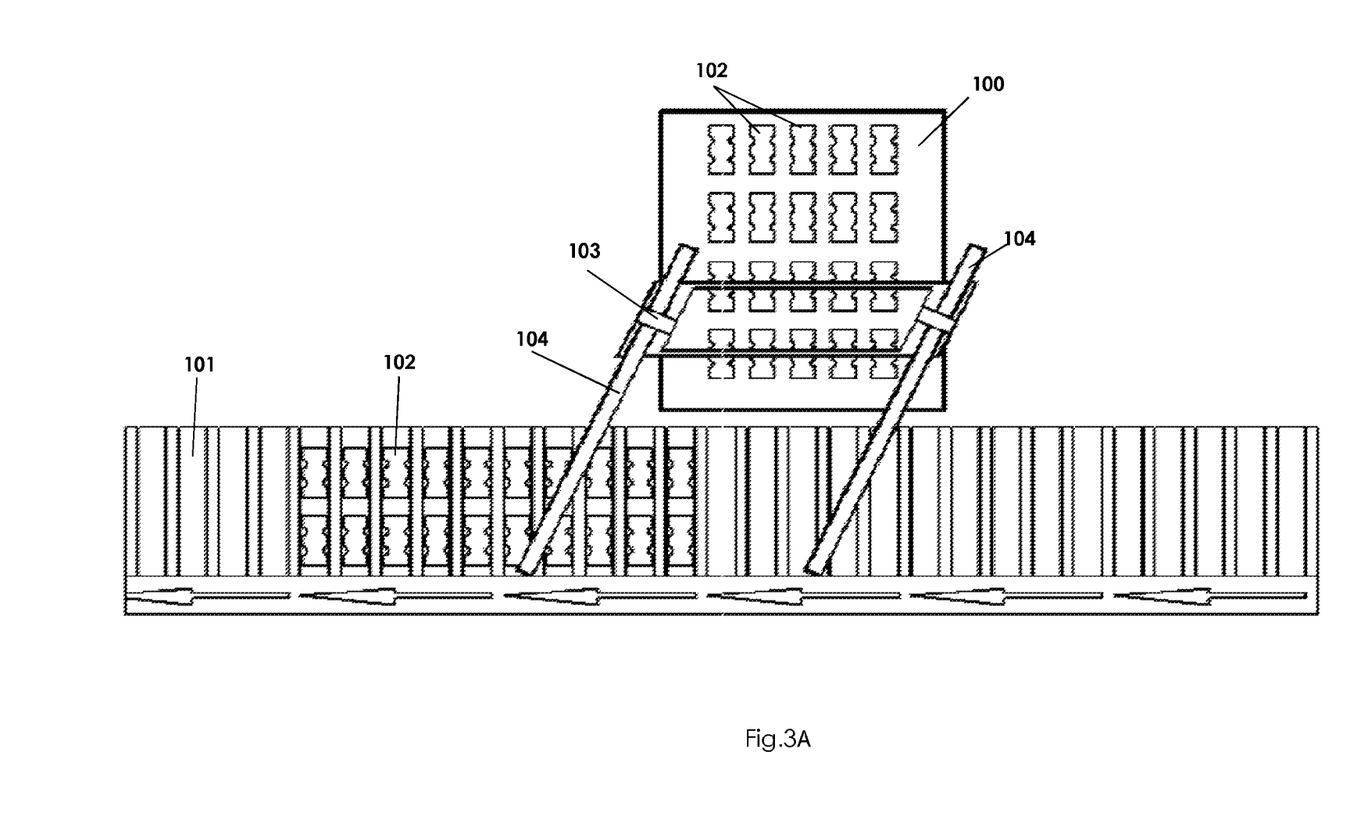
FIG. 3A is a schematic top view of an embodiment of a diagonal feeding system, illustrating a beginning step of the feeding cycle.
Figure 3B:
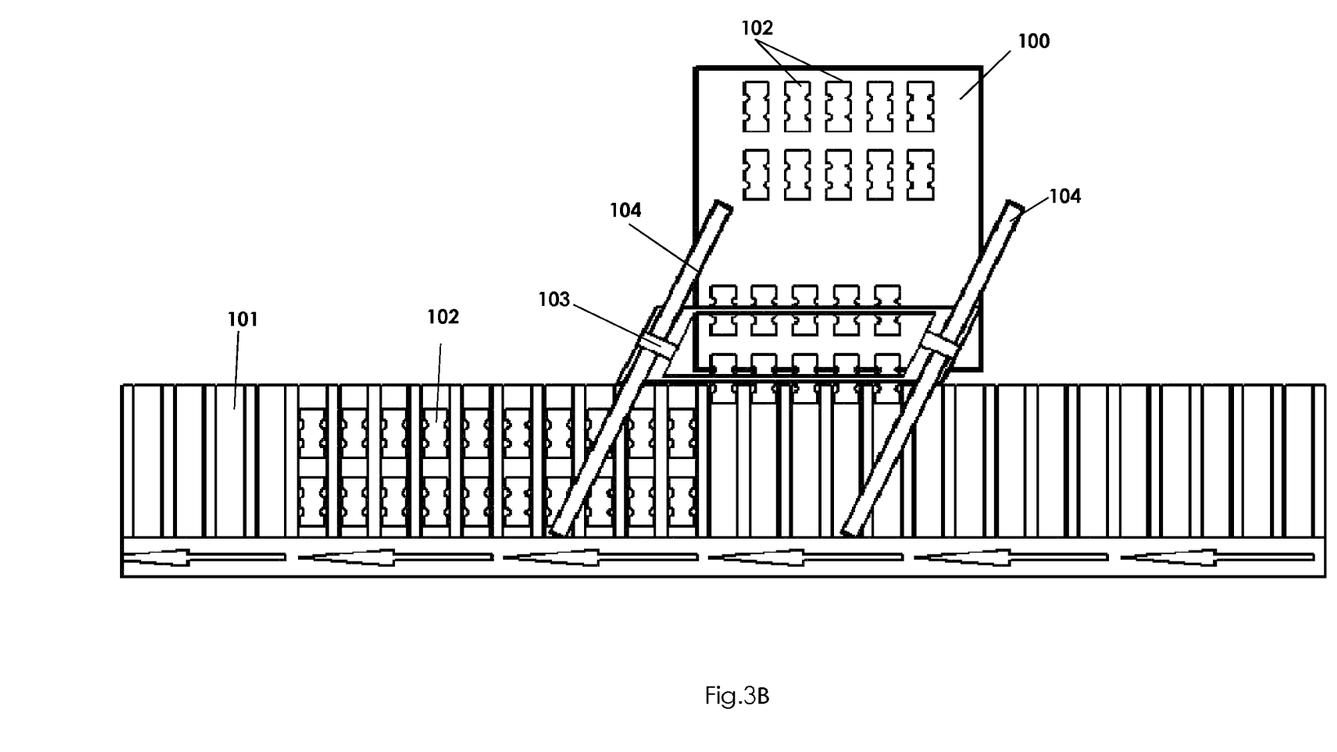
FIG. 3B is a schematic top view of an embodiment of a diagonal feeding system, illustrating a progressing step of the feeding cycle.
Figure 3C:
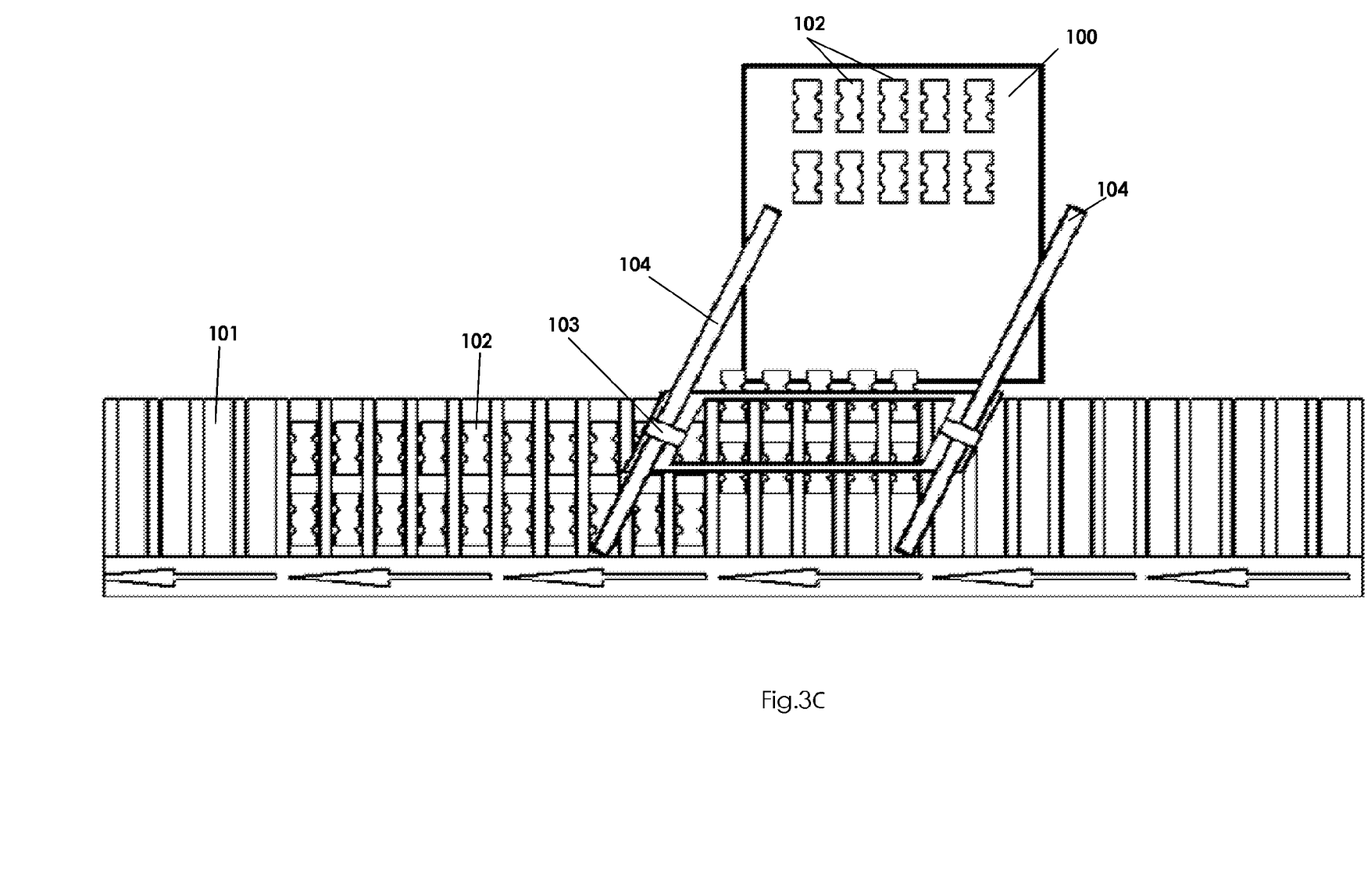
FIG. 3C is a schematic top view of an embodiment of a diagonal feeding system, illustrating a yet further progressing step of the feeding cycle.
Figure 3D:
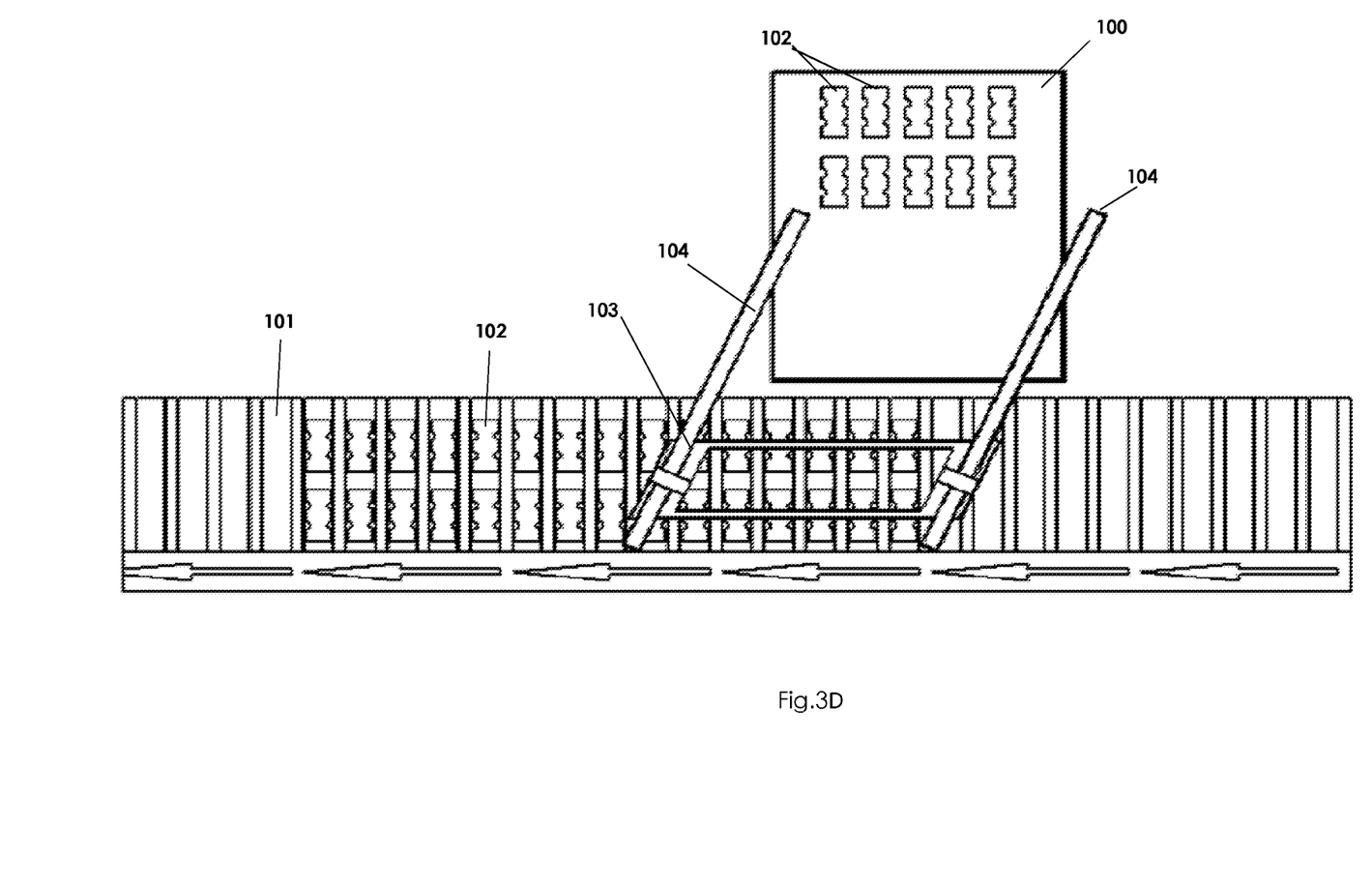
FIG. 3D is a schematic top view of an embodiment of a diagonal feeding system, illustrating an enclosing step of the feeding cycle.
Figures 4A, 4B:
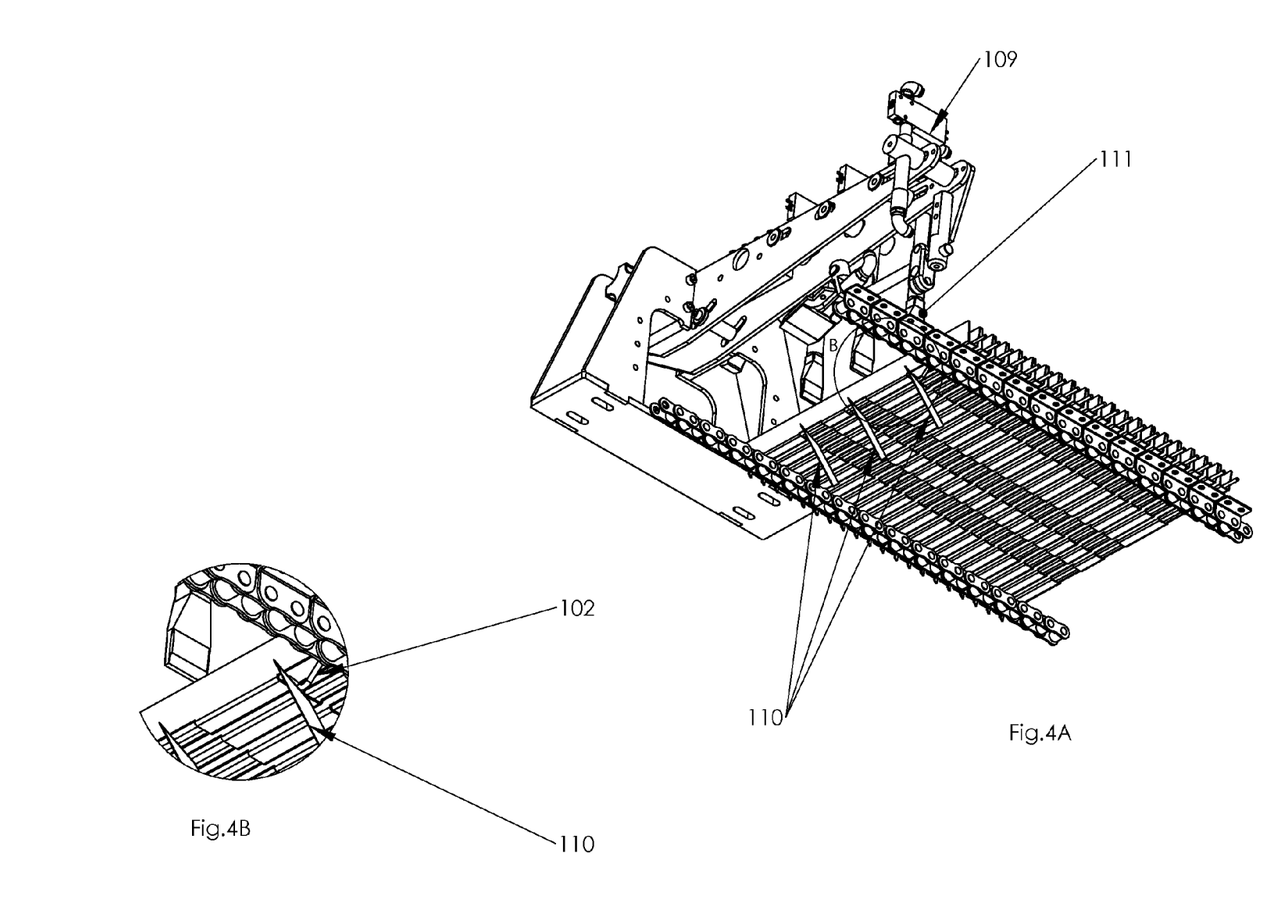
FIG. 4A an isometric view of the cutting system
FIG. 4B is an enlarged isometric view of the cutting system.
Figure 5:
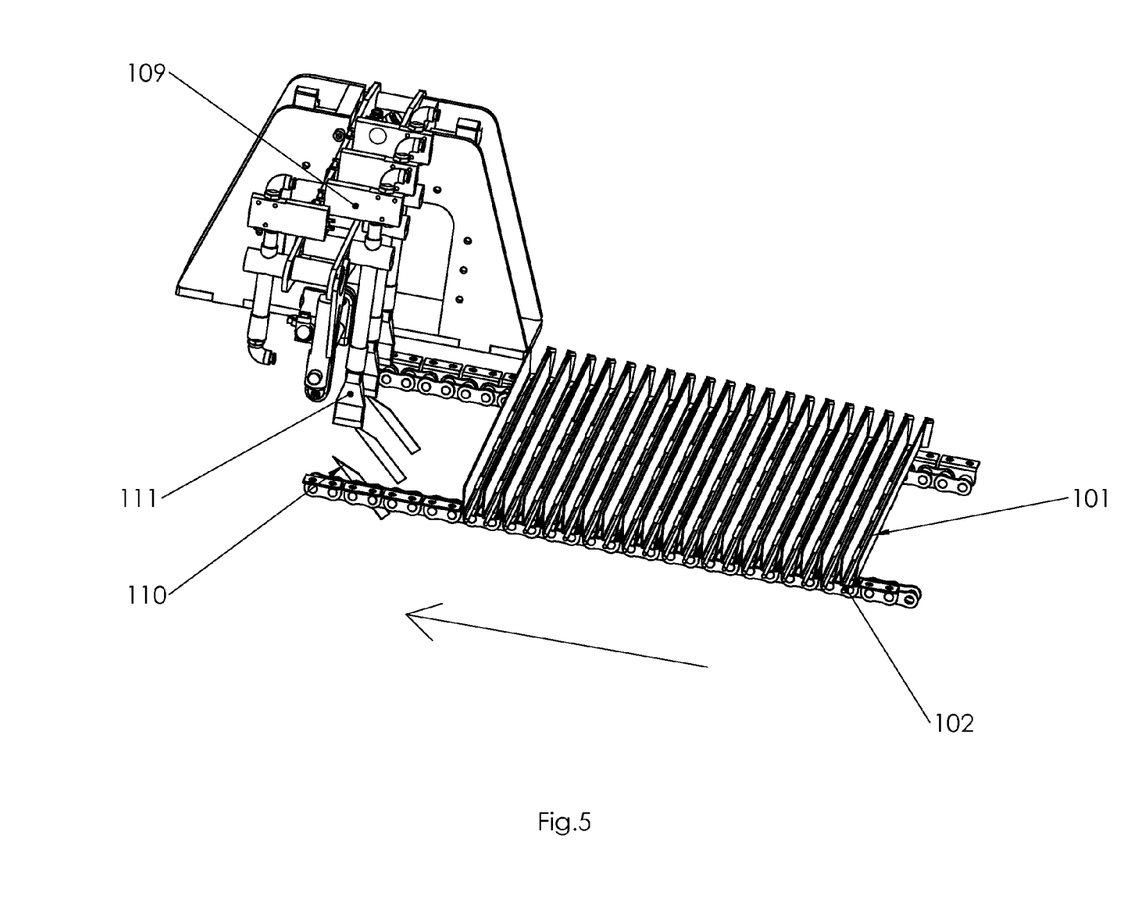
FIG. 5 is a perspective view of the cutting system.
Figure 6A:
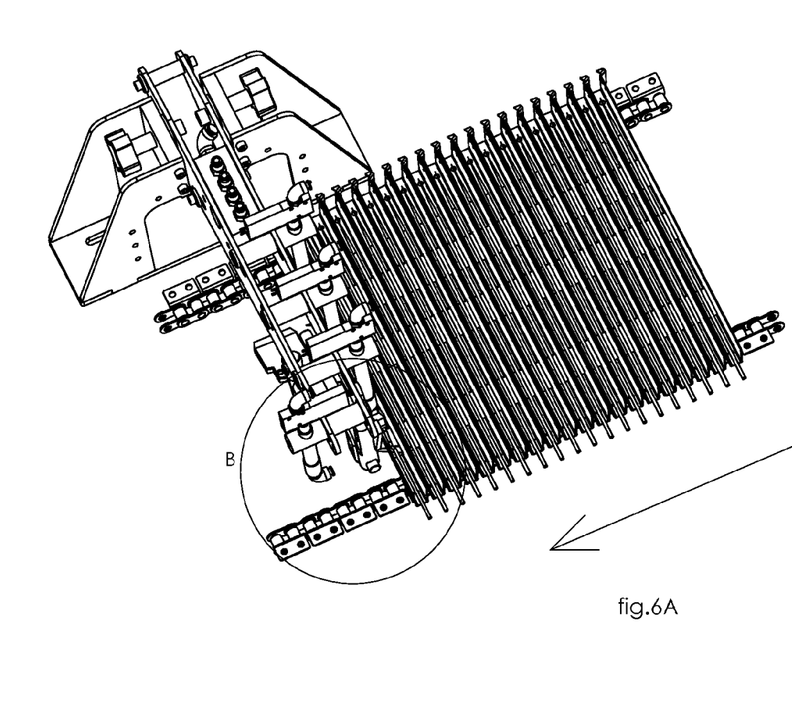
FIG. 6A is another perspective view of the cutting system.
Figure 6B:
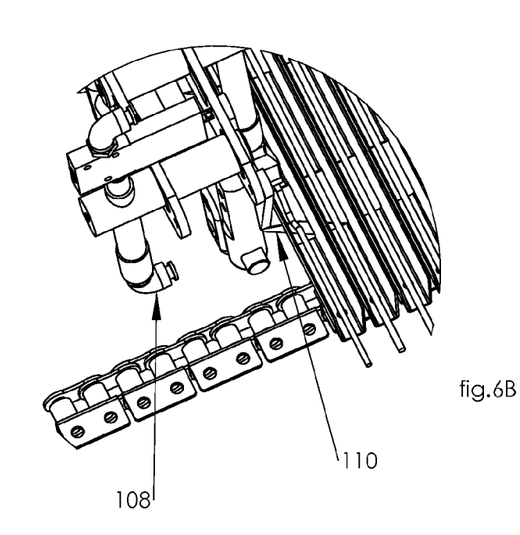
FIG. 6B is an enlarged perspective view of the cutting system.

Feeding system 106 preferably comprises a servomechanism drive, electronically scheduled and synchronized with the drive system of the conveyor belt. The drive system of conveyor belt keeps the conveyor advancing continuously. At the final stage articles 102 are released from gripping element 103 to spontaneously fall into partitions 101. The conveyor belt keeps moving and so do the gripping element 103 up to a point when articles 102 are aligned as desired across the width of the conveyor belt. At this point feeding system 106 has terminated a half of the loading cycle. Thereafter gripping element 103 return back (not shown) to feeding tray 100 to complete an entire feeding cycle of system 106.

While articles 102 are in conveyor belt partitions 101 being transferred forwards, articles 102 are preferably photographed and programmatically analyzed by digital camera 108. The analyzed results determine which article 102 is to be emitted, cut or sorted, so as to be thereafter automatically bundled and packaged. According to analysis results, articles 102 are then channeled to different compartments (not shown). Articles 102 that are to be cut are preferably conveyed to cutting system 109.

Reference is now made to FIG. 4A to 6D, showing cutting system 109. When partitions 101 loaded with articles 102 reach cutting system 109, articles 102 are forced towards sharp knives 110. Articles 102 bend towards knives 110 due to a synchronized pulse of air pressure emitted by air pressure system nozzles 111. The quick encounter of articles 102 with sharp knives 110 makes a cut at the meeting point and cut articles 102 advance to a bundling and packaging area. It is noted that partitions 101 preferably comprise an aperture configured to facilitate the encounter of articles 102 with knives 110.

It will be appreciated by persons skilled in the art that the present invention is not limited by what has been particularly shown and described herein above. Rather the scope of the invention is defined by the claims which follow:

What is claimed is:

1. An automated system for continuously feeding articles onto a moving conveyor belt, said system comprises:
   (a) a plurality of partitions forming said conveyor belt;
   (b) a controllable drive operatively connected to said conveyor belt, wherein the controllable drive is configured to continuously advance said conveyor belt;
   (c) at least one gripping element configured to controllably grip and lift said articles, thereby rendering said articles suspended from said at least one gripping element;
   (d) at least one divider bridge configured to sustain a linear movement of said at least one gripping element along said at least one divider bridge, wherein said at least one divider bridge is disposed at a predetermined angle relative to said conveyor belt.

2. The system, according to claim 1, further comprises:
   (a) a feeding tray, whereon said articles are placed prior to being collected by said gripping element;
   (b) at least one routing track operatively connected to said at least one divider bridge, wherein said at least one routing track is configured to define said predetermined angle between said at least one divider bridge and said conveyor belt;
   (c) at least one encoder configured to collect data regarding at least one parameter selected from the group consisting of: a speed of said conveyor belt and a location of said conveyor belt.

3. The system, according to claim 1, wherein a speed of said linear movement of said at least one gripping element along said at least one divider bridge is determined according to the following Equation 1:

$$V1 = V2/\cos \alpha \qquad \text{(Equation 1)},$$

wherein V1 is a speed of said at least one gripping element relative to said at least one divider bridge; α is said predetermined angle between said at least one divider bridge and said conveyor belt; V2 is a speed of advancement of said conveyor belt.

4. The system, according to claim 1, further comprises:
   (a) a digital camera configured to obtain digital images of said articles, while moving in said partitions of said conveyor belt;

(b) an analyzer configured to determine according to said digital images at least one automatic operation performed on said articles selected from the group consisting of:
   (I) cutting an article;
   (II) sorting an article;
   (III) bundle an article, and
   (IV) packaging an article.

5. The system, according to claim 1, wherein said partitions of said conveyor belt comprising an aperture, further comprises a cutting system comprising:
   (a) at least one knife;
   (b) at least one air pressure nozzle;
   wherein upon air pressure emitted from said at least one air pressure nozzle, said articles bend towards said at least one knife while in motion and thereby cut.

6. The system, according to claim 5, wherein said air pressure is applied as a pulse, synchronized with advancement of said conveyor belt.

7. The system, according to claim 1, wherein said gripping element is configured to perform at least one operation selected from the group consisting of: forming a vacuum, inducing a magnetic field and physically engaging said articles.

8. An automated method of continuously feeding articles onto a moving conveyor belt, said method comprises:
   (a) providing a plurality of partitions forming said conveyor belt;
   (b) continuously advancing said conveyor belt;
   (c) controllably gripping and lifting said articles, thereby suspending said articles;
   (d) sustaining a linear movement of said articles at a predetermined angle relative to said conveyor belt;
   (e) controllably releasing said articles, whereby said articles spontaneously fall into said partitions of said conveyor belt.

9. The method, according to claim 8, further comprises:
   (a) placing said articles on a feeding tray;
   (b) defining said predetermined angle between said at least one divider bridge and said conveyor belt;
   (c) collecting data regarding at least one parameter selected from the group consisting of: a speed of said conveyor belt and a location of said conveyor belt.

10. The method; according to claim 8, wherein a speed of said linear movement of said articles at said predetermined angle relative to said conveyor belt is determined according to the following Equation 1:

$$V1 = V2/\cos \alpha \quad \text{(Equation 1)},$$

wherein V1 is a speed of said articles; $\alpha$ is said predetermined angle; V2 is a speed of advancement of said conveyor belt.

11. The method, according to claim 8, further comprises:
   (a) obtaining digital images of said articles, while moving in said partitions of said conveyor belt;
   (b) analyzing said digital images and determining to perform at least one automatic step selected from the group consisting of:
      (I) cutting an article;
      (II) sorting an article;
      (III) bundling an article, and
      (IV) packaging an article.

12. The method, according to claim 8, wherein said partitions of said conveyor belt comprising an aperture, further comprising:
   (a) providing at least one knife;
   (b) providing at least one air pressure nozzle;
   (c) emitting air pressure from said at least one air pressure nozzle;
   (d) bending said articles towards said at least one knife by said air pressure while in motion and thereby cutting said articles.

13. The method, according to claim 12, wherein said air pressure is applied as a pulse, synchronized with advancement of said conveyor belt.

14. The method; according to claim 8, wherein said gripping element is configured to perform at least one operation selected from the group consisting of: forming a vacuum, inducing a magnetic field and physically engaging said articles.

15. An apparatus for continuously feeding articles onto a moving conveyor belt, said apparatus comprises:
   (a) a plurality of partitions forming said conveyor belt;
   (b) a means of continuously advancing said conveyor belt;
   (c) a means of controllably gripping and lifting said articles;
   (d) a means of sustaining a linear movement of said articles at a predetermined angle relative to said conveyor belt;
   (e) a means of controllably releasing said articles, whereby said articles spontaneously fall into said partitions of said conveyor belt.

16. The apparatus, according to claim 15, further comprises:
   (a) a means of defining said predetermined angle between linear movement of said articles and said conveyor belt;
   (b) a means of collecting data regarding at least one parameter selected from the group consisting of: a speed of said conveyor belt and a location of said conveyor belt.

17. The apparatus, according to claim 15, wherein a speed of said linear movement of said articles at said predetermined angle relative to said conveyor belt is determined according to the following Equation 1:

$$V1 = V2/\cos \alpha \quad \text{(Equation 1)},$$

wherein V1 is a speed of said articles; $\alpha$ is said predetermined angle; V2 is a speed of advancement of said conveyor belt.

18. The apparatus, according to claim 15, further comprises:
   (a) a means of obtaining digital images of said articles, while moving in said partitions of said conveyor belt;
   (b) a means of analyzing said digital images configured to perform at least one automatic operation selected from the group consisting of:
      (I) cutting said articles;
      (II) sorting said articles;
      (III) bundling said articles, and
      (IV) packaging said articles.

19. The apparatus, according to claim 15, wherein said partitions of said conveyor belt comprising an aperture, further comprising:
   (a) a means of cutting said articles;
   (b) a means of emitting air pressure onto said articles.

20. The apparatus, according to claim 19, wherein said air pressure is applied as a pulse, synchronized with advancement of said conveyor belt.

* * * * *